US012693126B2

(12) United States Patent
Sheoran et al.

(10) Patent No.: US 12,693,126 B2
(45) Date of Patent: Jul. 28, 2026

(54) NETWORK ASSISTED NAVIGATION FOR INTERACTIVE APPLICATIONS

(71) Applicant: AT&T Intellectual Property I, L.P., Atlanta, GA (US)

(72) Inventors: Amit Kumar Sheoran, Raritan, NJ (US); Jia Wang, Basking Ridge, NJ (US); He Yan, Berkeley Heights, NJ (US); Timothy Geraghty, Florham Park, NJ (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 415 days.

(21) Appl. No.: 17/989,888

(22) Filed: Nov. 18, 2022

(65) Prior Publication Data

US 2024/0167827 A1 May 23, 2024

(51) Int. Cl.
*G01C 21/34* (2006.01)
*H04W 28/02* (2009.01)

(52) U.S. Cl.
CPC .... *G01C 21/3461* (2013.01); *H04W 28/0268* (2013.01)

(58) Field of Classification Search
CPC .... G01C 21/3461; G01C 21/34; G01C 21/26; G01C 21/00; H04W 28/0268
See application file for complete search history.

(56) References Cited

U.S. PATENT DOCUMENTS

| | | |
|---|---|---|
| 5,543,789 A | 8/1996 | Behr et al. |
| 5,799,256 A | 8/1998 | Pombo et al. |

| | | | | |
|---|---|---|---|---|
| 2010/0094534 A1* | 4/2010 | Naick | ............... | G01C 21/3484 |
| | | | | 701/532 |
| 2013/0034016 A1* | 2/2013 | Bai | ........................ | H04W 84/18 |
| | | | | 370/254 |
| 2015/0110044 A1* | 4/2015 | Berzin | .............. | H04W 28/0252 |
| | | | | 370/329 |
| 2016/0119813 A1* | 4/2016 | Sridhar | ............. | H04W 28/0967 |
| | | | | 370/229 |
| 2017/0219368 A1* | 8/2017 | Meredith | ........... | G01C 21/3484 |
| 2021/0204164 A1* | 7/2021 | Yavuz | ................... | H04L 47/781 |
| 2022/0116265 A1* | 4/2022 | Boyle, III | .............. | H04L 43/20 |
| 2022/0116814 A1* | 4/2022 | Di Girolamo | .......... | H04L 65/80 |
| 2022/0167188 A1* | 5/2022 | Soulhi | .................. | G06N 3/0455 |

FOREIGN PATENT DOCUMENTS

| | | | | |
|---|---|---|---|---|
| WO | WO-2016150494 A1 * | 9/2016 | ............ | H04W 4/024 |

OTHER PUBLICATIONS

"QoS Class Identifier", Wikipedia printed Nov. 3, 2022, 3 pages.

* cited by examiner

*Primary Examiner* — Kito R Robinson
*Assistant Examiner* — Alexander V Gentile
(74) *Attorney, Agent, or Firm* — Guntin & Gust, PLC; Mark Wilinski

(57) ABSTRACT

Aspects of the subject disclosure may include, for example, receiving source information and destination information from a user device, receiving information defining an interactive application from the user device. determining, using network information of a mobility network, a navigation path from a source to a destination, the navigation path selected to enable continuous use of the interactive application with the user device on the mobility network during a journey from the source to the destination, and communicating navigation path information to the user device. Other embodiments are disclosed.

20 Claims, 7 Drawing Sheets

240

100

200

240

300

600

NETWORK ASSISTED NAVIGATION FOR INTERACTIVE APPLICATIONS

FIELD OF THE DISCLOSURE

The subject disclosure relates to network assisted navigation for interactive applications on a user device.

BACKGROUND

Navigation applications on user devices such as smartphones provide directional information to users. Communication networks are being built out with additional capabilities to provide improved service to users.

BRIEF DESCRIPTION OF THE DRAWINGS

Reference will now be made to the accompanying drawings, which are not necessarily drawn to scale, and wherein.

DETAILED DESCRIPTION

Figure 1:
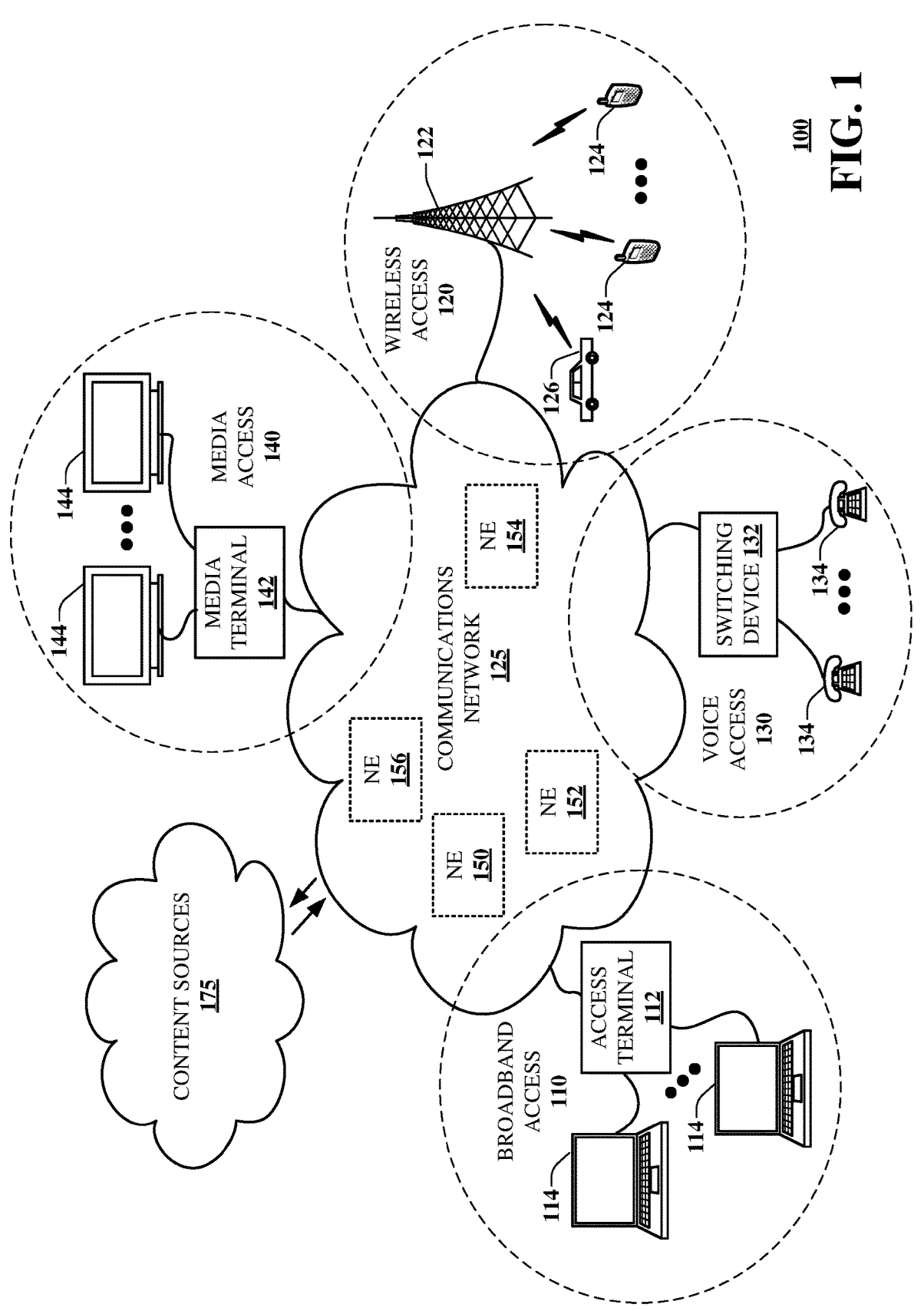
FIG. 1 is a block diagram illustrating an exemplary, non-limiting embodiment of a communications network in accordance with various aspects described herein.

The subject disclosure describes, among other things, illustrative embodiments for determining a navigation path for a user device such as a smartphone using network-level information about congestion in the network and other quality of service (QoS) issues. The network path is chosen to provide connection quality that enables the user to continuously use an interactive application such as a video conferencing application while travelling. In embodiments, the disclosed system and method direct a user to take a path on a journey that avoids real time data congestion, scheduled or unscheduled maintenance, and other network quality issues, such as known inconsistent coverage, that may impact application performance. Other embodiments are described in the subject disclosure.

One or more aspects of the subject disclosure include receiving source information and destination information from a user device, receiving information defining an interactive application from the user device. determining, using network information of a mobility network, a navigation path from a source to a destination, the navigation path selected to enable continuous use of the interactive application with the user device on the mobility network during a journey from the source to the destination, and communicating navigation path information to the user device.

One or more aspects of the subject disclosure include receiving, at a mobility network, a request for navigation information from a user device, the user device attached to the mobility network for communication services, the navigation information for a journey of the user device, receiving application identification information for an interactive application to be used with the user device on the journey of the user device, determining quality of service (QoS) requirements for the interactive application, determining a navigation path for the journey satisfying the request for navigation information, wherein the determining the navigation path is based on the QoS requirements for the interactive application, communicating navigation path information to the user device.

One or more aspects of the subject disclosure include receiving a request to use an interactive application on a user device attached to a mobile network, the interactive application requiring a high quality of service on a persistent connection with the mobility network, determining quality of service (QoS) requirements for the interactive application, determining a navigation path from a source location to a destination location, wherein the determining the navigation path is based on the QoS requirements for the interactive application, and communicating navigation path information to the user device, the navigation path information cooperating with a mapping application of the user device to provide graphical travel directions to a user device to travel on the navigation path, the navigation path selected to enable continuous use of the interactive application by a user of the user device.

Referring now to FIG. 1, a block diagram is shown illustrating an example, non-limiting embodiment of a system 100 in accordance with various aspects described herein. For example, system 100 can facilitate in whole or in part providing to a user of a mobility network or wireless network a navigation path selected using network information to allow a user of an interactive application on a user device to continuously use the application while travelling, with little risk of disruption due to network issues. In particular, a communications network 125 is presented for providing broadband access network 110 to a plurality of data terminals 114 via access terminal 112, wireless access network 120 to a plurality of mobile devices 124 and vehicle 126 via base station or access point 122, voice access network 130 to a plurality of telephony devices 134, via switching device 132 and/or media access network 140 to a plurality of audio/video display devices 144 via media terminal 142. In addition, communication network 125 is coupled to one or more content sources 175 of audio, video, graphics, text and/or other media. While broadband access network 110, wireless access network 120, voice access network 130 and media access network 140 are shown separately, one or more of these forms of access network can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access network 120, voice access network 130, media access network 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
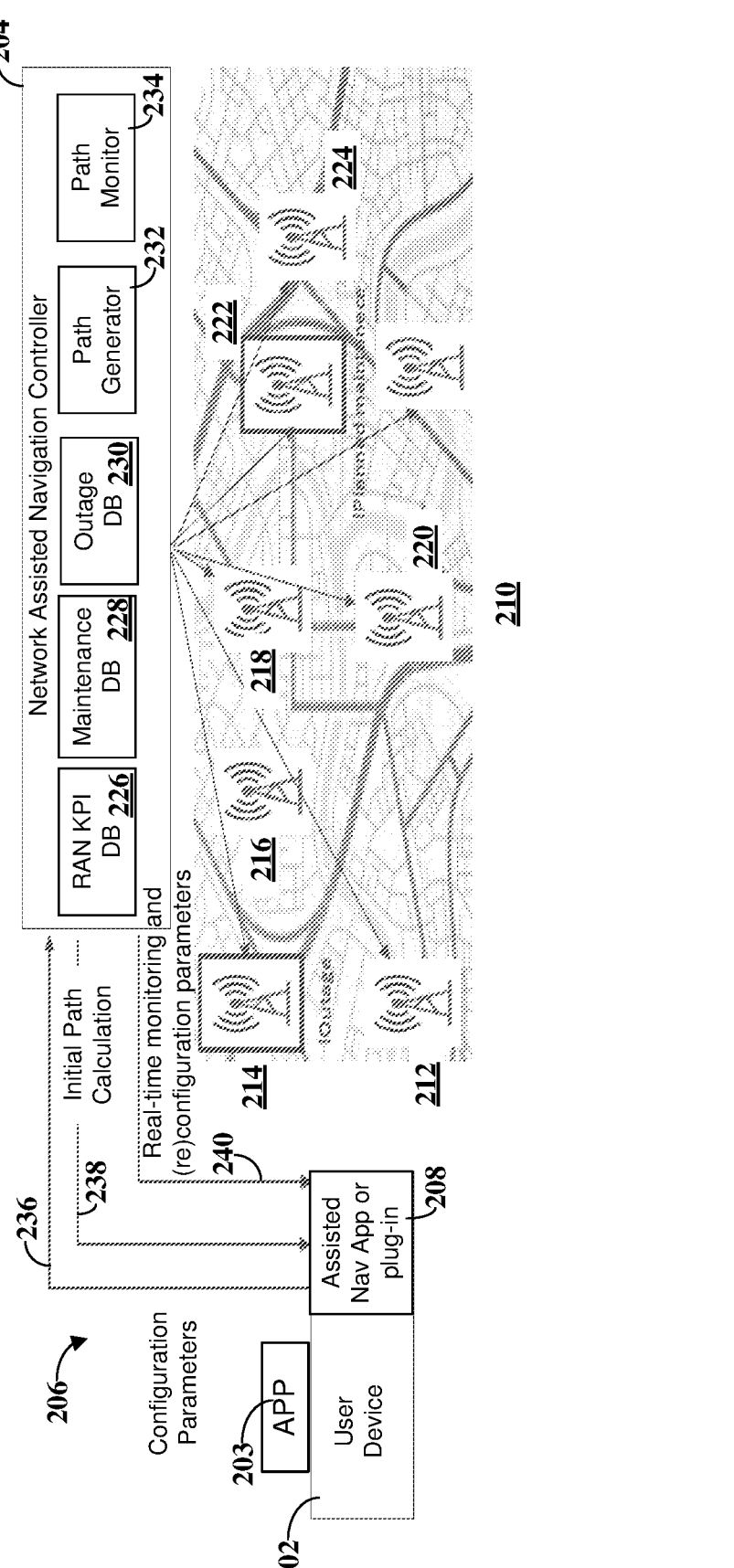
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the system 100 of FIG. 1 in accordance with various aspects described herein. In embodiments, system 200 may operate in conjunction with wireless access network 120 and communications network 125 to provide communication services to user equipment including mobile devices 124 and vehicle 126 via base station or access point 122.

Networked applications such as video streaming, video conferencing, online gaming, social media, and voice over internet protocol (VoIP), require good quality of connection, including such factors as throughput, jitter, and latency. Such applications have stringent throughput requirements. However, mobile network quality of service (QoS) varies depending on the coverage, user location including signal strength, network congestion, and other factors. User mobility also has a significant impact on the quality of experience (QoE) as the user might be traveling through a region that has poor QoS due to congestion or scheduled or unscheduled maintenance. Users should be able to continue to use latency and throughput sensitive services while the users are on the move.

The system 200 of FIG. 2A includes a user device 202 and a network assisted navigation controller or navigation controller 204. The user device 202 and the navigation controller 204 are in data communication over network 206. The network 206 may include any combination of wireless or wireline networks including some or all portions of the system 100 and communications network 125 of FIG. 1.

The user device 202 may include any mobile or portable communications device such as a smartphone, a tablet computer, a laptop computer and others. In exemplary embodiments, the user device 202 generally includes a processing system including a processor and memory, a communication interface for wireless or wireline communication with remote devices over the network 206 and a user interface for interaction with a user. The user device 202 in some embodiments cooperates with equipment including a wireless network of a network provider to provide communication services to the user device 202. Such communication services may include voice calls, data sessions including browsing on a web browser. The user device 202 may include any number of functions for providing services to the user of the user device 202. Such services may be provided by the service provider or by third parties accessed by the user device 202 over the network 206 and other facilities of the service provider. For example, the service provider may provide data communication to the public internet for data communication with third party providers.

In the example of FIG. 2A, the user device 202 includes a priority application 203 and an assisted navigation module 208. The priority application 203 may be any particular application used by the user of the user device in conjunction with communication services. In examples, the priority application 203 may be an interactive application in which the application 203 and a remote user or remote device maintain a connection over a period of time and cooperate with each other in some fashion. Examples of an interactive applications include a video conferencing application or a virtual reality (VR) game that requires a consistent, persistent connection between the priority application 203 on the user device 202 and the service provider or by third parties accessed by the user device 202. In the video conferencing application, two or more parties see and hear each other over a persistent connection during the duration of a call. In the VR game, a player engages another player or a machine playing the game itself over an extended period of time. In a video streaming or audio streaming application data representative of video or audio content is communicated from a remote location to the client application on the user device. In particular, the priority application 203 and other interactive applications require a particular quality of service (QoS) level and a particular quality of experience (QoE) level for satisfactory performance.

In embodiments, the assisted navigation module 208 includes one or more portions of code stored in memory such as the memory of the user device 202. For example, the assisted navigation module 208 may be embodied as an application or app which is stored on the user device 202 and interacts with the user device 202 to provide navigation functionality. In another example, the navigation module 208 may be embodied as a plug-in or other software component stored on the user device 202. As discussed further herein, the assisted navigation module cooperates with the user interface and the communication interface of the user device 202 to communicate information over the network 206 with the navigation controller 204.

The navigation controller 204 is associated with a mobility network 210. The mobility network 210 includes a plurality of base stations including base station 212, base station 214, base station 216, base station 218, base station 220, base station 222, and base station 224 in the example. Each respective base station provides radio communication service to mobile devices such as user device 202 in a geographic area served by the respective base station. As a mobile device such as user device 202 moves through the region covered by the mobility network 210, radio communication with the mobile device is handed off from one base station to another.

The mobility network operates according to a published standard such as the fifth generation (5G) cellular standard. Each base station includes, for example, one or more eNodeB or gNodeB devices for radio communication with mobile devices such as the user device 202. For convenience, these will be collectively referred to herein as gNodeB devices. The mobility network 210 further includes a core network including devices that provide functions such a mobility management, billing, etc., to the mobile devices and users associated with the mobile devices. The core network may include a packet data gateway that allows the core network to communicate with external devices including the public internet. The core network and the packet data gateway allow data communication between the base stations and mobile devices such as the user device 202 and remote, third-party sources. In this manner, an application operating on the user device 202 such as a video conferencing application or a gaming application that requires constant data communication may connect to the third-party source.

The navigation controller 204 may be located at any suitable location in the mobility network 210, such as the core network. In the exemplary embodiment, the navigation controller 204 includes data storage and functional blocks. These include a radio access network key performance indicator (RAN KPI) database 226, a maintenance database 228, an outage data base 230, a path generator module 232 and a path monitor 234. In various embodiments, these data storage and functional blocks may be supplemented with other data and functions or may be arranged and combined differently, and so forth. The embodiment of FIG. 2A is intended to be exemplary only.

The RAN KPI database 226 stores information about performance of respective base stations of the mobility network 210. In particular, the stored data may include information about current and historical traffic loading and congestion of each base station and each gNodeB device in the mobility network 210. KPI data may include information about data throughput, jitter, latency, packet loss statistics, number of mobile devices attached to a gNodeB device, handover statistics and other factors that may affect availability of radio resources at the gNodeB. The KPI data in the RAN KPI database 226 are updated substantially in real time. The mobility network 210 continuously monitors KPI data for broad aspects of the network as a check on network health and functionality. The KPI data are tracked throughout the network and stored in the RAN KPI database 226. The navigation controller 204 may use the information stored in the RAN KPI database 226 to configure resources of the mobility network 210 to accommodate an application such as the priority application 203 of the user device 202.

The maintenance database 228 receives and stores information about network devices of the mobility network 210 that may be undergoing or scheduled for maintenance or other operations that may affect availability of such network devices. For example, an upgrade of network equipment for one or more base stations may cause the affected base stations to be unavailable for a time period. During this time period, the network will be reconfigured to maintain full functionality but may be subjected to reduced capacity, additional delays or other effects. In the example of FIG. 2A, base station 222 of the mobility network 210 is indicated as unavailable due to planned maintenance. Such information is stored in the maintenance database 228 and may be retrieved by the navigation controller 204. Generally, such maintenance is scheduled and therefore predictable Information about the scheduling and extent of such maintenance may be stored in the maintenance database 228. The navigation controller 204 may use the information stored in the maintenance database 228 to configure resources of the mobility network 210 to accommodate the priority application 203 of the user device 202.

The outage database 230 receives and stores information about network devices of the mobility network 210 that may be subject to a short-term outage or unavailability. For example, a short-term disruption of network availability may occur due to a natural disaster or other factor. During this time, the network will be reconfigured to maintain full functionality but may be subjected to reduced capacity, additional delays, or other effects due to the outage. Information about the occurrence and extent of such outages may be stored in the outage database 230. In the example, base station 214 is indicated as experiencing an outage. Such information is stored in the outage database 230 and may be updated to indicated progress resolving the outage. Such information in the outage database 230 may be retrieved by the navigation controller 204. The navigation controller 204 may use the information stored in the outage database 230 to configure resources of the mobility network 210 to accommodate the priority application 203 of the user device 202.

The path generator 232 operates to determine a navigation path through the region served by the mobility network 210 for the user device 202. The path generator 232 may use any available information and algorithm to determine the navigation path. In the example of FIG. 2A, the path generator 232 receives initial configuration parameters 236 from the user device 202. The initial configuration parameters may include any suitable information such as identification of the user or the user device 202, identification of the priority application 203 that requires guaranteed QoS to support the priority application 203, such as a video conferencing application. Further, the path generator 232 receives key performance indicator (KPI) information from the RAN KPI database 226, maintenance information from the maintenance database 228, and outage information from the outage database 230. The path generator 232 determines a suitable navigation path for the user device 202 through the region based on the received information. The navigation path is determined to maintain adequate QoS metrics for the user device 202 to continue operating the priority application 203 during the journey through the region.

The path generator provides an initial path calculation 238 to the user device 204. The initial path calculation 238 may be provided to the assisted navigation module 208 of the user device 202 to provide to the user device 202 a route indication of a route to follow through the region in order to maintain acceptable quality of service (QoS) and quality of experience (QoE) for the user associated with the user device 202 during usage of the priority application 203. The assisted navigation module 208 may provide the route indication to the user in any suitable manner. In one example, the assisted navigation module 208 cooperates with a map application also operating on the user device 202 to provide a visual map output, audible directions, and other guidance.

The path monitor 234 operates to continuously monitor QoS metrics for the user device 202 and for the priority application during use of the priority application on the mobility network during the journey. The path monitor 234 may use any information to monitor QoS metrics including current information from the RAN KPI database 226. Moreover, the path monitor 234 monitors information from the maintenance database 228 and the outage database 230. Based on the monitored information, the path monitor 234 dynamically updates the navigation path. The path monitor 234 provides the updates to the navigation path as real-time configurations parameters information 240 to the user device 202.

In embodiments, the navigation controller 204 provides navigation information to the user device 202. The navigation controller 204 may be part of a service offered by the service provider to subscribers such as the user device 202 or a user associated with the user device 202. The service provider may offer a wide range of services to the user device including services of third parties that may be accessed through the network 206 and other facilities of the service provider. Such services may be provided as networked applications.

Networked applications may communicate asynchronous data and isochronous data. Networked applications such as video streaming, video conferencing, online gaming, social media, voice over internet protocol (VoIP) communicate isochronously and generally require good quality of connection for optimum quality of experience (QoE) for a user. QoE is a measure of satisfaction or annoyance of a customer's experiences with a service such as mobile communication. Connection quality is dependent on factors such as network key performance indicators (KPIs). Such KPIs include throughput, jitter, and latency and others. Some network applications, especially isochronous applications, have stringent throughput requirements, for example, to provide consistent QoE for a customer.

For a mobile network user, QoE may be a function of measurable parameters such as mobile network quality of service (QoS). QoS refers to the description or measurement of overall performance of the communication service. However, mobile network QoS varies depending on the coverage, user location, signal strength, network traffic congestion, and other factors. User mobility also may have a significant impact on the QoE as the user might be traveling through a region that has poor QoS due to factors such as traffic congestion and scheduled or unscheduled maintenance on network equipment.

As an example, when navigating from a source to a destination, in some embodiments, the user can access the user interface of user device 202 to access an application on the user device 202 for use while travelling. The application may be an application such as priority application 203 which is sensitive to QoS factors. Example applications that are sensitive to QoS factors such as latency and throughput include gaming applications, video streaming applications, or streaming communication applications such as FaceTime®.

Consider a scenario where a user starts a video conferencing session while travelling from a source to a destination. The user wants to ensure that the video conferencing session is not dropped or interrupted during the journey due to network QoS issues. Conventional applications try to mitigate temporary congestion issues by allocating larger application buffers and caching as much data as possible. However, such solutions cannot be used for interactive applications such as a video conferencing session. Typically, a user device would display a reactive message indicating poor network quality or similar. The message is reactive and is displayed in response to the occurrence of poor network quality.

Another common solution is use multiple radio access networks (RAN) or a multi-RAN solution. A RAN is a network that provides radio access to user equipment in the vicinity of a base station or access point. An example is wireless access network 120 of FIG. 1. In some cases, more than one RAN provides coverage to an area where a user device is located. A multi-RAN solution may offload radio communication from an initial RAN communicating with the user device to another RAN such as Wi-Fi or fourth generation long term evolution (4G LTE) in case of fifth generation (5G) as the initial RAN. In embodiments, the system and method can consider multiple radio access technologies in an area before redirecting a user. Another multi-RAN solution is to make use of carrier aggregation to improve application throughput. However, such conventional solutions cannot address QoS issues due to scheduled or unscheduled maintenance or other runtime variables such as network load etc.

Some other solutions propose using a machine learning (ML) based solution which can use historical parameters such as signal strength to infer and identify network coverage areas with historical poor performance, such as spotty coverage. However, such ML-based solutions operating on a mobile user device cannot support navigation applications that require estimating QoS at a given location during a journey and estimating network conditions. Estimating network conditions may require, for example, predicting future user location and estimating future QoS at the location. The information required to make such decisions solely exists in the carrier domain and is not available to the mobile device.

In embodiments, the system and method in accordance with various aspects described herein may provide a recommended navigation path which can support the configured application. A user can provide at least a destination, or a source and destination, for the journey. The system and method provide a recommended navigation path to arrive at the destination. The recommended navigation path can generally guarantee the QoS required to support use of a given application during the journey, including isochronous applications operated between the user device and the service provider or a third party The recommended path can also be dynamically updated to handle any unscheduled outage or flash workloads. The recommended network path may be based on information available to the mobile communication network from network sources and other sources. Conventional mapping applications provide a recommended path based on vehicle traffic congestion on roadways. The system and method provide a recommended path based on network communication quality, instead of congestion, to ensure satisfactory quality of service for a particular application on the user device throughout the journey.

Conventional solutions to responding to poor network quality include caching more data. If an application is, for example, streaming video content and detects poor network quality, the application may cache more data to ensure that video playback is not interrupted. Current video data is drawn from the cache which is expanded in response to poor network quality. However, caching does not work for an interactive application such as a video call or a gaming application.

In embodiments, the system and method in accordance with various aspects described herein may predict or estimate a user's geographic location at a particular time of day, such as 10 minutes in the future. Further, the system and method may identify the network equipment required to service that user for a particular application based on the determined geographic location, including cell tower equipment, switching equipment and backhaul equipment. The system may then determine whether the required network equipment will experience any service interruption at that time. Service interruptions may include a cell tower unavailable due to current maintenance, unusual data traffic congestion, power outage or other factors.

In one example, the user may provide as an input application identification information for applications the user will be using during the journey. In another example, the method and system may automatically identify which applications or other functions are currently being used or expected to be used by the user on the user equipment during the journey and produce application identification information. One or more applications may be a priority application such as priority application 203 which requires a high, consistent QoS level to maintain adequate QoE throughout the journey. The system and method may respond to the application identification information and provide a recommended navigation path which can support the identified application. If the identified application is not sensitive to QoS issues, the recommended navigation path may generally follow a conventional path based on vehicle traffic congestion. On the other hand, if the identified application is sensitive to QoS issues, the recommended navigation path may be chosen to avoid areas of known service interruptions that may affect usage of the identified application by the user.

In response to determining any known QoS issues that the user is likely to encounter on the journey, the system and method may create a dedicated bearer that is used to carry traffic for the application associated with the application identification information. A bearer is a connection between a radio access network such as a 5G network and the core network of the network operator. The core network includes devices providing functions like mobility management, billing and access to a packet data network such as the public internet. A bearer may include a source internet protocol (IP) address, a source port identification, a destination IP address, a destination port address, and a protocol.

Conventionally, if a user equipment device such as a smartphone is running multiple applications, data for all the applications generally follow the exact same path through the radio access network and the core network. The multiple applications are given the same priority. The multiple applications are given the same quality of service. The network does not allocate any dedicated resources for any of the multiple applications. This is the default model in which a mobility network functions.

In the system and method in accordance with some aspects described herein, the system creates a dedicated bearer that is used to carry traffic belonging to the application associated with the application identification information. In general, network resources are dedicated to providing the application to the user device over the network.

Resources that may be dedicated to the application may include any available resource such as bandwidth or a quality of service class identifier (QCI). The QCI is a mechanism in some communication networks to ensure that carrier traffic is allocated appropriate QoS. Typically, the QCI is a scalar value that is used within network devices such as a gNodeB to control packet forwarding treatment. QCI generally corresponds to priority of packets in the network. Packets for conversational voice, live streaming and gaming, for example, are giving the highest priority. Other packets such as buffered video may be given a lower priority. QCI can be adjusted for the particular application of the user equipment. For example, the QCI value for a streaming connection can affect the latency, throughput and jitter values for the connection.

For example, dedicated bandwidth or QCI for this particular application for a particular user device may be pre-allocated by the network. The effect is to give the particular application a differential quality of service that can be better than or have a higher priority than other applications of the user device. Further, the network can ensure that the particular application does not experience congestion at the radio network level. The dedicated bearer or other dedicated resources form a means for distinguishing traffic of the particular application from remaining applications of the user device and other user devices in the area.

In embodiments, the system and method can provide active network configuration and reconfiguration. In a first example, the mobility network typically has information about data congestion levels throughout the network. For example, if an event is occurring at a particular venue, large attendance at the venue may cause a substantial increase in data traffic in the network in the vicinity of the venue. The attendance may also create an increase in vehicle traffic in the vicinity of the venue. If the user making use of the network assisted navigation controller 204 of the mobility network 210 enters the area of high data traffic, the mobility network 210 under control of the network assisted navigation controller 204 may adjust network configuration to minimize effects of the high data traffic on the user.

In one example, the system and method may adjust network configuration by creating a dedicated bearer that is used to carry traffic for the priority application in order to differentiate the traffic for the priority application. The traffic for the priority application may get a higher priority, such as a higher QCI priority, for example, to ensure that the traffic for the priority application does not get dropped by the network. The traffic for the priority application will not be affected by the high level of data traffic that may affect other users or other applications.

In another example, the network may adjust network configuration by assigning more spectrum or communication bandwidth to the bearer assigned to the traffic for the priority application. More bandwidth will allow the data of the priority application to be communicated more rapidly between a base station and the user device. In another example, the network may adjust network configuration by scheduling communication for the bearer assigned to the traffic for the priority application more frequently. A frequency channel in a mobility network is multiplexed among many uplink connections and downlink connections in time so that many user devices share the frequency channel. Each user device is assigned a time slot for communication. The base station or other network component includes a scheduler that controls time slot assignment. The bearer assigned to the traffic for the priority application may be assigned more frequent time slots. This will allow the data of the priority application to be communicated more rapidly between the base station and the user device.

In another example, the network may adjust network configuration by assigning the user device 202 to a different frequency band. In some mobility networks, some frequency bands carry more data or carry data at a higher data rate or throughput than other frequency bands. For example, channels in the 1800 MHz band carry more data than channels in the 900 MHz band. The network may reassign the user device to a different frequency band or force the user device 202 to attach to a different frequency band that carries data at a higher data rate. This will allow the data of the priority application to be communicated more rapidly between the base station and the user device.

In another example, the network may adjust network configuration by forcing the user device 202 to hand off from a first gNodeB to a second gNodeB, particularly where the first gNodeB or base station is subject to congestion from data traffic. Moving the user device 202 to a less congested gNodeB may allow more network resources to be assigned to the user device 202. This will allow the data of the priority application to be communicated more rapidly between the base station and the user device.

Figure 2B:
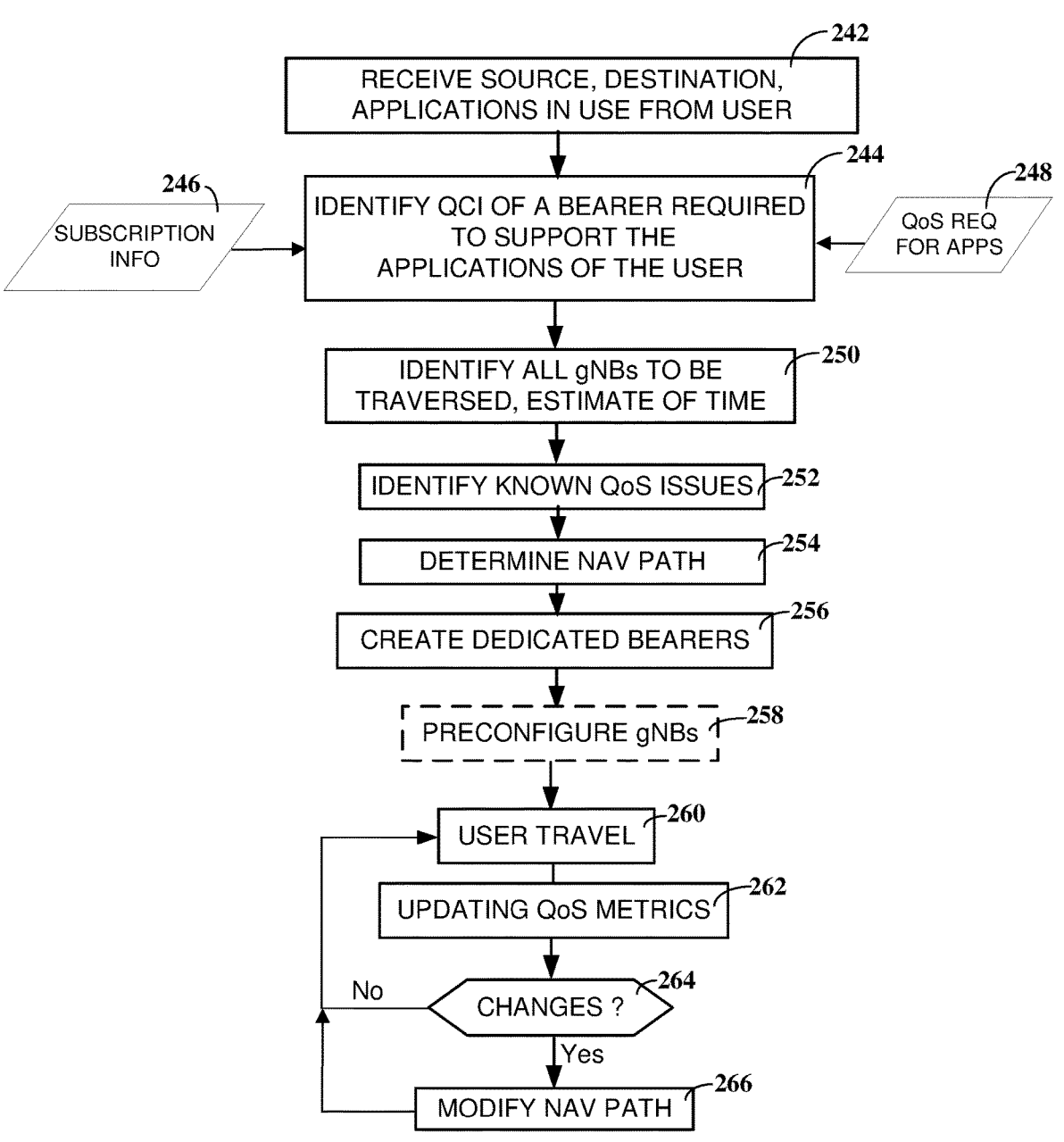
FIG. 2B depicts an illustrative embodiment of a method in accordance with various aspects described herein.

FIG. 2B depicts an illustrative embodiment of a method 240 in accordance with various aspects described herein. The information may be performed at any suitable location, such as at a component such as a server computer of a core network of a mobility network, at any gNodeB of the mobility network, and others. The method 240 may be used to identify quality of service (QoS) requirements for a particular application to be used by a user associated with a user device operating on the mobility network. A dedicated bearer may be assigned to the user and a navigation path determined for the user through the mobility network. During user travel, the system continues to monitor and update QoS metrics and may incorporate changes into an updated navigation path. Thus, the method uses information available only at the network level to determine a path for the user which will maintain adequate QoS and user quality of experience (QoE). The method 240 may be a part of a service provided by a network operator or carrier to customers or subscribers, for example for a monthly fee or other compensation.

Step 242 may begin with a request for the user to opt-in to participation in the method 240 or a service including the method. An opt-in notification may be provided to the user with suitable cautions about using the user device or service while a vehicle is in motion.

At step 242, the method 240 includes receiving information identifying a source, a destination and one or more applications in use or having a high priority for the user. In an exemplary embodiment, the user operates a user device such as a smartphone attached to the mobility network. The mobility network may be, for example, a 5G cellular network including a radio access network (RAN) providing radio communication to mobile devices such as the user equipment and a core network providing network management functions and connection to other packet data networks.

At step 242, the source and destination may be received in any suitable manner. In an embodiment, the user device includes a mapping or navigation application such as Google Maps or Apple Maps. The mapping application may be supplemented with a software module in the form of a plug-in or another application. The software module may cooperate with the mapping application to communicate with a network assisted navigation controller or similar device of the mobility network.

The source and destination may be received as, for example, latitude and longitude information for the origin point of a journey and a destination point of a journey. In another example, the source and destination may be received as address information or an identifier of a point of interest. In some embodiments, the user may manually enter source and destination information such as by typing the information on a user interface of the user device. In some embodiments, the user device may include a global positioning system (GPS) receiver which provides current positioning information for the user device. The GPS receiver may provide the source information for example while the user manually enters or selects a destination. The source information and the destination information may be communicated over the mobility network to the network assisted navigation controller or similar device of the mobility network.

Further, identification information for one or more applications of the user device is communicated to the network assisted navigation controller. In particular embodiments, the identified applications are interactive applications that include features of allowing the user of the user device to interact with another person or a device over the mobility network. Examples include applications that provide video streaming, video conferencing, online gaming, social media, and VoIP. In a video conferencing application, for example, the user at the user device may see and speak with one or more other parties remotely during an ongoing conversation over the mobility network. Similarly, in a gaming application, the user at the user device may interactively exchange gaming moves according to a gaming strategy with one or more remote players or with a remote processing system, again over the mobility network. The remote party or remote player may connect to the user solely through the mobility network. Or the user as well as the remote party or remote player may collectively engage with a server or other device of a third-party which is accessible over the mobility network in combination with one or more other networks such as the public internet.

The identification information for one or more applications of the user may refer to conventional applications stored on the user device. Alternatively, the identification information may identify any functionality or software code or features operating on the user device, especially those that offer interactive engagement by the user with another over the mobility network. The term application is used here but the operation may be extended to other similar functionality.

In a first embodiment, the user identifies the one or more applications to be addressed by the method 240. This may be done in any suitable manner, such as by designating applications of interest to the user on a user interface of the user device. In another example, the plug-in or other software module operating on the user device may automatically identify applications of interest. Such applications of interest may include applications currently in use by the user, such as if the user is currently engaged in a video telephone call, applications which are known to be used interactively, and others. The identification information for the applications may be communicated from the user device to the network, in particular to the network assisted navigation controller or similar functionality of the mobility network.

At step 244, the method 240 includes determining a bearer required to support the user application and identifying the Quality Class Identifier (QCI) of the bearer required to support user application. The method 240 creates a dedicated bearer that is used to carry traffic belonging to the applications associated with the application identification information received at step 242. A bearer is a connection between a radio access network such as a 5G network and the core network of the network operator. Generally, a bearer is defined by a source internet protocol (IP) address, a source port identification, a destination IP address, a destination port address, and a protocol. The QCI is a mechanism in some communication networks to ensure that carrier traffic is allocated appropriate QoS. Typically, the QCI is a scalar value that is used within network devices such as a gNodeB to control packet forwarding treatment. QCI generally corresponds to priority of packets in the network.

In the embodiment of FIG. 2B, the method 240 accesses stored data to identify the QCI required for the applications of the user. In this example, step 244 retrieves the user subscription information 246 for the user and QoS requirements 248 for the application. In some embodiments, the user may subscribe to the network assisted navigation service for interactive applications as provided by the network operator or carrier. The user may pay a fee such as a monthly fee for access to the service. The service may be provided at varying levels with various available features. The subscription information 246 may be stored in any suitable location such as a provisioning database at the time the service is provisioned to the user's account.

In step 244, the subscription information for the user may control or affect the level of service available to the user. For example, a minimum-level subscription may entitle the application of the network assisted navigation service only to video conferencing applications such as FaceTime®. A higher level of service may entitle the user to application of the service to other application such as gaming applications, or to particular gaming applications such as those offered by the network provider or third-party providers.

The QoS requirements 248 refer to the description or measurement of overall performance of the communication service. Such factors may include packet loss, error rate, latency, packet delay variation, out-of-order delivery of packets and lag. Interactive applications such as gaming and video conferencing may be particularly susceptible to factors affecting QoS. The QoS requirements 250 may originate from any source such as the carrier's empirical experience providing an interactive service and the recommendations of the source or author of a particular interactive application.

Based on the QoS requirements for the application, a QCI for the application is determined. Any suitable technique for determining the appropriate QCI may be used. In general, the method 240 including step 244 operates to advance or bump up the QCI for the application to a higher priority than the application would normally be assigned. For example, in one standard, non-conversational video is assigned a QCI number of 4 corresponding to a priority of 5 (on a scale of 1 through 9). In step 244 may increase the QCI number to 1 having a priority of 2 and normally assigned to conversational voice.

At step 250, the method 240 includes an operation of identifying all gNodeB devices that the user and user device will traverse during the journey and an approximate, estimated time at which the gNodeB device will be traversed. The time is estimated based on all available information about vehicular traffic on the route and other information. As the user device travels on the journey, with the interactive application active, communication with the network will be handed off to a succession of gNodeB devices of the mobility network in the conventional manner. In step 250, one or more routes may be determined between the source and the destination received at step 242. A list or other collection of the gNodeB devices to be encountered on the one or more routes may be formed.

At step 252, all known QoS issues for the collection of the gNodeB devices identified in step 246 are identified. A QoS issue is a situation in the network, currently or at a time in the future, that will affect the QoS experienced by the user device as the user device operates the interactive application during the journey. A QoS issue or discrepancy, at any of the gNodeB devices traversed on a recommended navigation path, can affect QoE of the user and user device on the journey. For any QoS issue, information about timing for the QoS issue is collected as well. For example, if the QoS issue occurs daily during afternoon rush hour, that information may be used to determine a navigation path. Similarly, if a particular gNodeB is currently offline in an unplanned outage that is expected to last 48 hours, that information may be used to determine a navigation path for the user device.

In a first example, known, scheduled outages may affect QoS for the user device during the journey. For example, one or more components such as a gNodeB or a switch of the mobility network may be taken offline for repair, upgrade or for any other reasons. The mobility network remains functional as data traffic normally handled by the offline component is routed to other nearby substitute components. However, this modification to the network may affect QoS such as by increasing a network latency due to a longer round-trip time from the user device to the substitute component relative to latency with the offline component. Information about scheduled outages may be obtained from any suitable source. For example, the network operator may keep a log or schedule of intended network maintenance projects that may be consulted at step 252.

In a second example, unscheduled outages in the mobility network may affect QoS for the user device during the journey. Similar to planned maintenance outages, the absence of a network component may introduce delays or other effects that will negatively affect QoS for the user device operating the interactive application during the journey. Since such outages are not scheduled, they create a dynamic situation that may affect QoS in unpredictable ways. However, if an unscheduled outage has occurred and been identified, the network operator may make a current record identifying the location and impact of the unscheduled outage and an estimated time to repair, if available. This information may be collected in step 252.

In a third example, current and historical congestion information for the mobility network may be used to identify possible QoS issues for the user device during the journey. Such information may be stored in any suitable location in the network. In one example, a particular group of gNodeB devices may routinely be subject to heavy data traffic during a particular time of day, such as afternoon rush hour for vehicle traffic. The heavy traffic may cause congestion that corresponds to delay or other reduction in QoS for a user device in that area at that time. The network operator may keep a log or other collection of congestion data for gNodeB devices of the network that may be consulted at step 252.

In a fourth example, historical cell site key performance indicator (KPI) information for gNodeB devices the mobility network may be used to identify possible QoS issues for the user device during the journey. Such KPI information may include historical failed call information at each gNodeB, historical dropped call information at each gNodeB, a number of connected users at each gNodeB during the day, and so forth. Further, the KPI data may be available in association with times of day for predicting reduction in QoS for a user device in that area at that time.

In a fifth example, information about a distance between a user and each cell site or each gNodeB may be used to identify possible QoS issues for the user device during the journey. For example, the distance information can be used to identify a frequency band that will be used by a user to connect to the gNodeB. This frequency band can be used to estimate application performance.

At step 254, the information about the source and the destination, the information about the interactive application and the information about known QoS issues, along with timing correlation for the QoS issues, may be used to determine a navigation path for the user device from the source to the destination. The method 240 may select a series of gNodeB devices in the mobility network that create a continuous path between the origin and the destination. Moreover, the series of gNodeB devices are selected to provide adequate QoS and QoE for the user making use of an interactive application on the user device. The user may continue to use one or more interactive applications, such as a video conferencing application, throughout the journey without interruption and with sufficient quality of experience.

In determining the navigation path at step 254, the method 240 may use any available information to further tailor the navigation path to the user's needs or preferences. For example, the user may express a preference for avoiding toll roads, or a preference for an ecologically friendly route. In embodiments, user preferences may be expressed in any suitable manner, such as interaction by the user with a dashboard or other features of the mapping application on the user device. In another example, the service which employs method 240 may include an aspect of monitoring a user's behavior to identify user preferences, and subsequently apply to those preferences when determining the navigation path. For example, the user may prefer to leave the freeway one exit before the closest exit to the destination and take surface streets for the remainder of the journey. This behavior can be detected and used in future path determination. The user may be asked to opt in to features which collect and act on personal information and behavior of the user.

At step 254, information about the navigation path is communicated to the user device by the mobility network. Any suitable communication technique or encoding may be used, and any suitable information may be sent, including turn-by-turn instructions. The communicated information may be tailored to operate in conjunction with a map application or a navigation application of the user device to provide user interface information. The user interface information may include a graphical map display, text providing turn instructions, audio prompts such as spoken prompts by a simulated voice, or others.

In some embodiments, because the navigation path information is to be used while the user is engaged with an interactive application such as a video conferencing application, the communicated information may modify the user interface navigation information. For example, the audio prompts may be suppressed to as not to interfere with the audio of the interactive application. This may prevent spoken word prompts from interfering with audio of a video conference for example. In another example, a video display device of the user interface of the user device may be modified to show portions of both the video of the interactive application and the user interface navigation information. For example, the graphical map of the navigation path may be displayed as a picture-in-picture of the video portion of the interactive application, such as a gaming application. In other examples, for safety, some functions of the interactive application and of the mapping application may be suppressed when the mapping application determines the vehicle of the user is in motion.

At step 256, the method 240 creates one or more dedicated bearers for the interactive applications. The dedicated bearer is used to carry data traffic in the mobility network for the interactive applications. The dedicated bearer may be assigned a specific QCI that will allow components of the mobility network such as gNodeB devices to differentially treat user traffic of user device while the interactive application is being used on the journey.

In an optional step 258, the gNodeB devices on the navigation path may be preconfigured to allow the user device to use more spectrum or allocate more spectrum. For example, some frequency bands enable higher data rate or higher data throughput. A connection on the 1800 MHz band allows a higher data rate than a connection on a 900 MHz band. Accordingly in step 258, the gNodeB devices may be preconfigured to direct the user device to the higher-throughput frequency bands. In an embodiment, preconfiguring the gNodeB devices may include programming the gNodeB devices to proactively force inter-frequency handoff when such a step is desirable. In this example, the user device is handed off from a 900 MHz band on a source gNodeB to an 1800 MHz band on a destination gNodeB. This has the effect of increasing throughput after the handover.

In another example, step 258 may involve modification of some routine handovers in the mobility network. In conventional operation, the network including the gNodeB devices has the capability to force a user device to handover from a source gNodeB to a destination gNodeB in a situation where the handover may not be required. For example, the forced handover may be done for load balancing in the network so that one gNodeB is not overloaded with data traffic while another gNodeB is relatively quiet. However, each handover may introduce a latency or a delay in the connection between the network and the user device. Each handover may correspond to an incident of poor coverage for the user device and a risk of a dropped connection and interruption to the interactive application.

In step 258, the route or path of the user device through the network is known from step 254. Thus, the time duration during which the user device will be attached to each gNodeB is known as well. If the time duration during which the user device is attached to a particular gNodeB is below a predetermined threshold, such as 3 seconds or 10 seconds, the particular gNodeB may be preconfigured to suppress forced handovers, particularly handovers that are instituted for network convenience reasons such as load balancing. Suppressing forced handovers has the benefit of reducing the likelihood of a dropped connection or added delay during the handover that might adversely affect the interactive application.

Step 258 may further include an operation of establishing a specific or variable QCI value for the user device on the dedicated bearer. QCI values enable differential treatment of user traffic and allow the user device and the interactive application to have a higher priority in the mobility network. Creating the dedicated bearer with a specific QCI will allow the carrier network to differentially treat user traffic of user device. In FIG. 2B, step 258 is shown in dashed lines to indicate that it is an optional step.

At step 260, user travel begins. The user, on foot or in a vehicle, may follow the navigation path provided to the user device. The user device may provide directions and prompts to the user based on the navigation path determined at step 254 and provided to the user. During the user travel of step 260, the one or more interactive applications continue operating with satisfactory quality of experience for the user.

At step 262, during user travel, the method 240 continues monitoring and updating QoS metrics. For example, a new unplanned outage of a network component may create additional delays at a location on the navigation path determined at step 254. In another example, unexpected vehicle traffic may create unanticipated congestion of data traffic at a particular network location that is part of the navigation path determined at step 254.

Thus, the method operates to determine substantially in real-time changes in the mobility network that might affect the quality of service of the interactive application in use by the user. At the network level, the network assisted navigation controller 204 (FIG. 2A) has access to current key performance indicator data in the RAN KPI database 226. If one or more radio networks, base stations or gNodeB devices experiences an event that may affect QoS, such as an increase in data traffic, the KPI information will reflect that event, substantially in real time. Similarly, if an outage occurs in the network, the outage may be reported and information about the outage stored in the outage database 230. The path monitor 234 has access to current, near real time information about status and functionality of the components of the mobility network and can respond immediately to changes in that status and functionality.

Further, because the network assisted navigation controller 204 has access to the navigation path, and therefore the planned route of the user device, the navigation controller 204 can look into the near future of the user device to identify any network issues or irregularities that might affect QoS for the user device in the near future. The navigation controller can retrieve KPI and other data for gNodeB devices and other network equipment that will be encountered by the user device in the near future, such as the next 10 minutes of the user's journey. If an event occurs that requires response, the path monitor 234 can determine a new path that will maintain adequate QoS for the user device and the interactive application. If necessary, the navigation controller 204 can reroute the user device to maintain adequate QoS.

At step 264, the method determines in the QoS metrics have changed or varied between the time the navigation path was determined at step 254 and the current time. If not, control returns to step 260 as the user travels onward. If there have been changes detected at step 264, at step 266 the navigation path determined at step 254 can be modified to accommodate the detected changes. Any changes can be dynamically incorporated into the navigation path, forming a new navigation path. In some embodiments, the new navigation path may extend across multiple radio technologies. For example, the method 240 may consider the availability of Wi-Fi and Wi-Max networks before redirecting the user to an alternate path. Communication may be handed from one radio access technology, such as Wi-Max, to another radio access technology such as 5G new radio (NR). The new navigation path may be communicated to the user device at step 266 and control returns to step 260 as the user travels onward. The method 240 may remain in a loop including step 260, step 262, step 264 and step 266 while the user continues on the journey. When the journey is completed, the method 240 ends.

The method 240 of FIG. 2B may be adapted to provide additional features and aspects. In one example, the navigation controller 204 (FIG. 2A) or another network feature may monitor the user's navigation paths over time and develop a history profile for the user. The history profile may be supplemented with other information known or collected about the user, such as residence information, employment address, and routine activities and destinations. The history profile may be used to predict user mobility including predicting a direction of movement by the user, a destination and a preferred route. The user may be required to opt into a feature that collects and stores personal information of the user.

In another example, the method of 240 may be incorporated into a service offered by the network operator. The service may be designed to include multiple tiers or service levels. Each tier could be priced according to the services provided. For example, at a basic service level, the user may request and receive routing directions and a navigation path to a specified destination, with good likelihood of ability to use the specified interactive application along the way. At a higher service level, the same service may be provided but with near certainty of being able to use the interactive application. At this level, the network gives the bearer assigned to the application highest priority to ensure necessary QoS levels. The network may reallocate additional spectrum to the user device and application or force the user device to frequency bands that offer higher data rates to maintain necessary QoS levels. At the higher service level, the network operates to increase priority in the network of data traffic for the user device and the interactive application.

Such a service is an example of monetizing a network assisted, dedicated bearer. The network can dedicate a bearer to the navigation service or to any suitable service provided to the user. The bearer can be assigned specified features and priority and the priority can be modified over time. In examples, the priority can be assigned based on a fee or subscription of the user and associated with features or capabilities or requirements of the user. For example, autonomous vehicles that must communicate with each other may subscribe to the service or feature and be assigned a dedicated bearer for autonomous operation.

In another example, the mobility network may employ various network reconfiguration tactics to maintain necessary QoS levels. One reconfiguration involves allocation of network slices. For example, a user playing an interactive game over the network may actually be interacting with a network slice instantiated a great distance away from the user. The server implementing the interactive game is located at that remote network slice. Because the interactive game is susceptible to latency issues that affect QoE, the network may be dynamically reconfigured to move the gaming application to a slice that is physically closer to the user. The gaming application can be moved and instantiated as a virtual network function (VNF). Similarly, edge computing arrangements can be used to move the network equipment closer to the user's current location. As the user moves along the navigation path, the server or other device that implements the interactive application can be virtually moved through the edge network to remain physically close to the user. This can reduce network latency and other KPIs and therefore improve QoS.

In another example, the mobility network may use the features of the method 240 to monitor network health. Currently, on some percentage of user devices in the mobility network, a software module operates to collect information about device performance. Collected information generally includes the quality of service the user is getting, bandwidth allocated to the user device, and so forth, as well as the precise location of the user device. The location information is matched with the quality of service information to provide to the network operator information about the quality of service at particular locations. This can be used, for example, for creating a map to help the network operator understand the current network and identify areas needing improvement.

As noted, this information is currently collected from only a small percentage of user devices, with user agreement to have personal information collected. The network assisted navigation service in accordance with features discussed herein enables collection of more information from more users, including users of the service. For example, a mapping application operating on the user device routinely determines the device's location but does not share that information with the network. For users of the service who opt in and provide consent, the sharing of user location data and device performance data can be changed so that the device's location is occasionally reported to the network operator, along with network quality information available only at the user device. This can improve the network operator's understanding of the functioning of the network.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
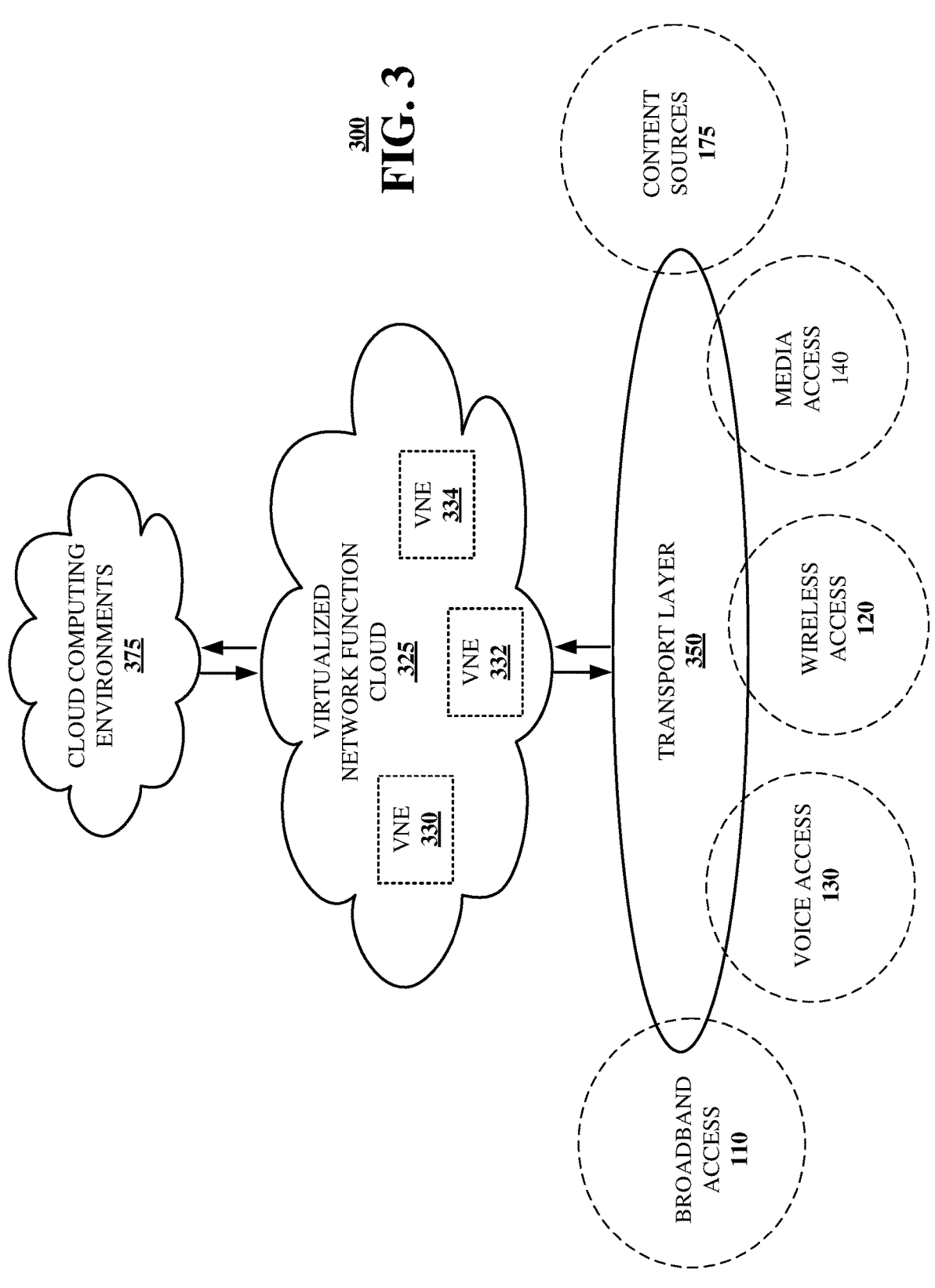
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network in accordance with various aspects described herein. In particular a virtualized communication network 300 is presented that can be used to implement some or all of the subsystems and functions of system 100, the subsystems and functions of system 200, and method 240 presented in FIG. 1, FIG. 2A, FIG. 2B, and FIG. 3. For example, virtualized communication network 300 can facilitate in whole or in part providing to a user of a mobility network or wireless network a navigation path selected by the mobility network using network information to allow a user of an interactive application on a user device to continuously use the application while travelling, with little risk of disruption due to the network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall, which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
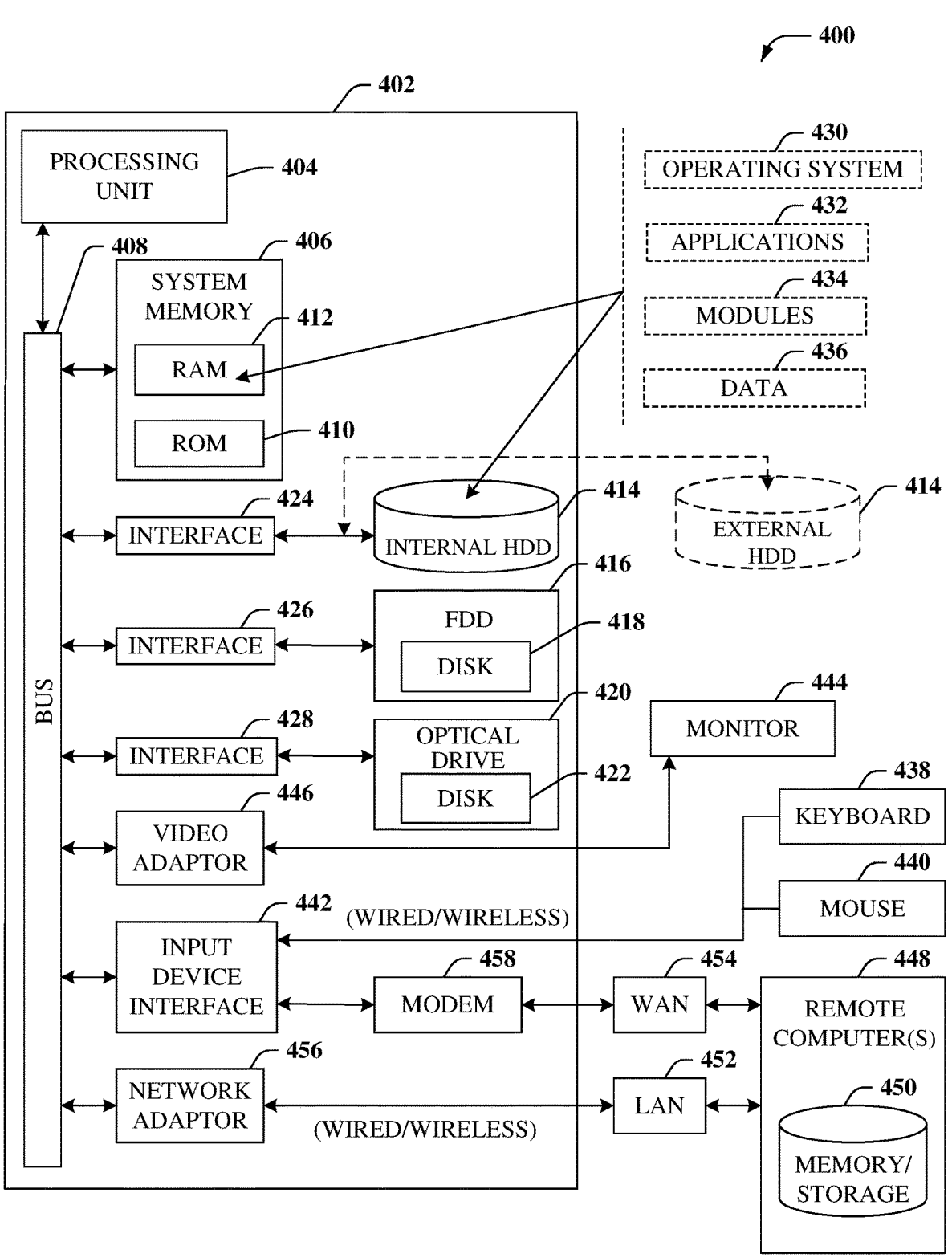
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving for a user device a request for navigation directions and identification of an interactive application that requires a stable, good quality connection for communication of data of the application, determining quality of service requirements of the application, selecting a navigation path that will allow the user device to travel while a user continuously uses the interactive application without network-based disruption.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
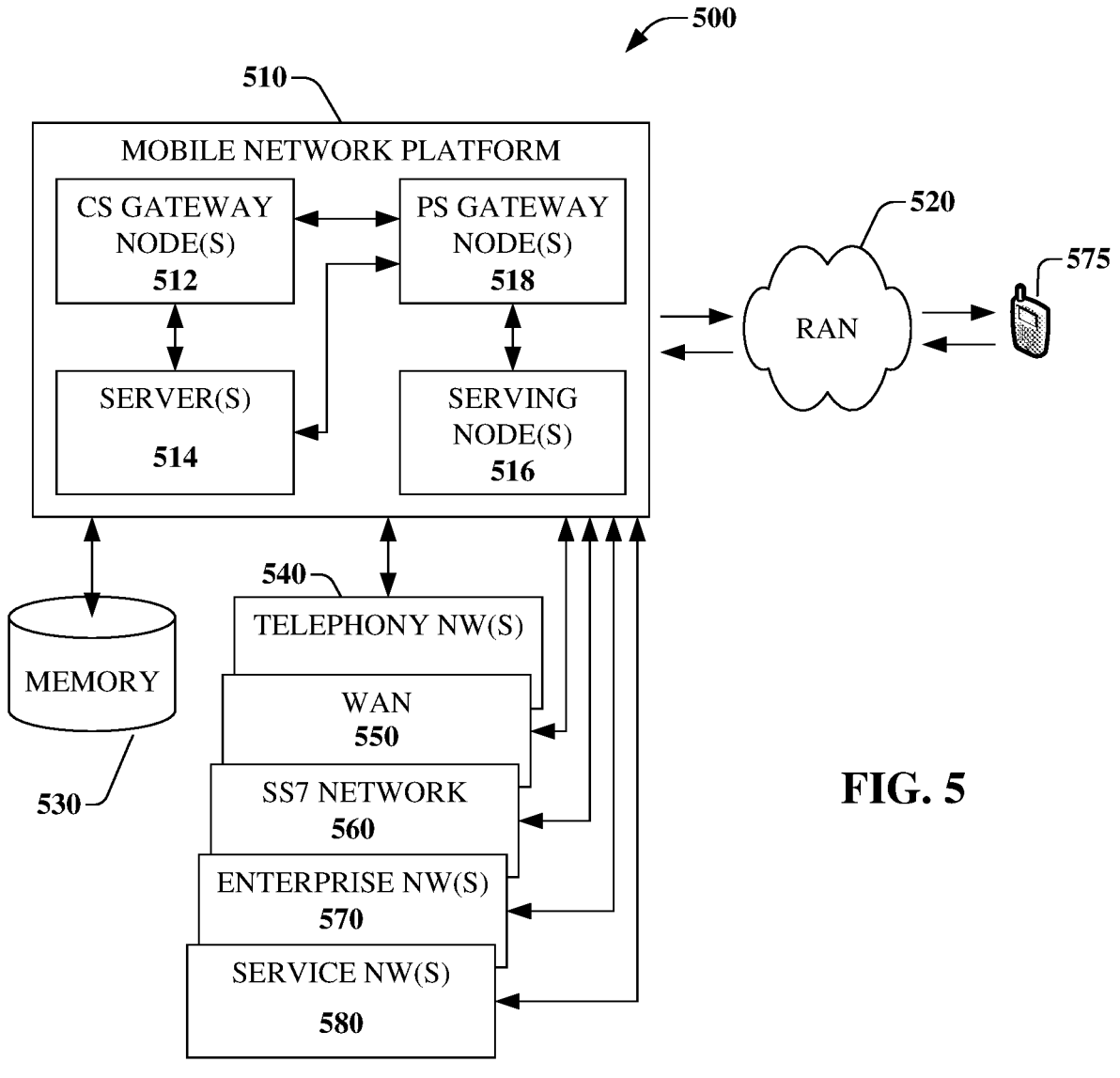
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part communicating with a user device operating on the mobile network and requesting navigation directions. The navigation directions can be chosen to maintain a required quality of service level, using information about network traffic, network congestion and other network activities that might disrupt usage of an interactive application on the user device. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
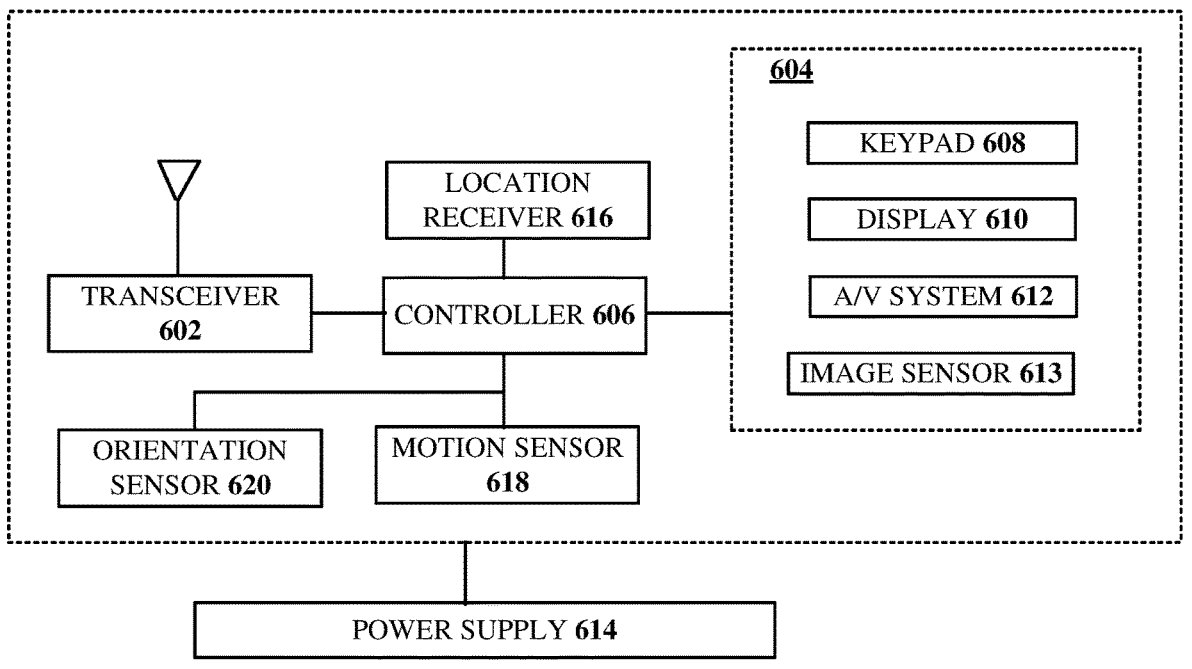
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144, user device 202 or other client devices for communication via either communications network 125 or mobility network 210. For example, computing device 600 can facilitate in whole or in part providing a request to the mobility network, the request identifying an interactive application desired to be used by a user of the user device and requesting navigation instructions, and further receiving navigation instructions which have been developed to maintain a consistent quality of service for interactive application.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X , UMTS/HSDPA, GSM/GPRS, TDMA/EDGE, EV/DO, WiMAX, SDR, LTE, 5G mmWave and 5G NR, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including using user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x) = $ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving source information and destination information from a user device;

receiving information defining a plurality of interactive applications from the user device, wherein the plurality of interactive applications includes a video conferencing application and a gaming application;

retrieving subscription information for a user associated with the user device;

determining, using network information of a mobility network, user preferences of a user of the user device, the source information, and the destination information, a navigation path from a source to a destination, the navigation path selected to enable continuous use of the plurality of interactive applications with the user device on the mobility network during a journey from the source to the destination in accordance with the subscription information indicating a level of service exceeding a threshold, wherein the network information includes distance information corresponding to a respective distance between the user device and each of a plurality of base stations from the source to the destination, wherein the user preferences are obtained via a mapping application on the user device and based on monitoring a behavior of the user, wherein the user preferences include a preference for avoiding tolls roads, wherein the user preferences include a preference for an ecologically friendly route, wherein the user preferences indicate that the user prefers to leave a freeway one exit before a closest exit to the destination and take surface streets for a remainder of the journey, and wherein the determining of the navigation path comprises identifying, based on the distance information, a frequency band that will be used by the user device to connect to at least one of the plurality of base stations during the journey; and communicating, based on the determining of the navigation path, navigation path information to the user device.

2. The device of claim 1, wherein the operations further comprise:

receiving key performance indicator (KPI) information for components of the mobility network; and determining the navigation path based at least in part on the KPI information.

3. The device of claim 2, wherein the operations further comprise:

receiving updated current KPI information;

modifying the navigation path based on the updated current KPI information to determine an updated navigation path; and communicating updated navigation path information about the updated navigation path to the user device.

4. The device of claim 2, wherein the receiving KPI information comprises:

receiving current KPI information for the components of the mobility network; and retrieving historical KPI information for the mobility network.

5. The device of claim 2, wherein the operations further comprise:

retrieving maintenance information for the mobility network;

receiving outage information for the mobility network; and determining the navigation path to avoid a maintenance operation of the mobility network and an outage of the mobility network.

6. The device of claim 1, wherein the operations further comprise:

determining quality of service (QoS) requirements of the plurality of interactive applications; and determining the navigation path based at least in part on the QoS requirements.

7. The device of claim 6, wherein the operations further comprise:

designating a bearer of the mobility network to support the plurality of interactive applications during the journey; and based on the QoS requirements, determining a quality of service class identifier (QCI) for the bearer.

8. The device of claim 1, wherein the operations further comprise:

identifying gNodeB devices of the mobility network that the user device will traverse during the journey;

estimating respective communication time for interaction between the user device and respective gNodeB devices;

identifying possible quality of service reductions for usage of the plurality of interactive applications at each respective communication time; and determining the navigation path based at least in part on the possible quality of service reductions.

9. The device of claim 1, wherein the operations further comprise:

determining quality of service (QoS) requirements of the plurality of interactive applications;

determining the navigation path based at least in part on the QoS requirements; and reconfiguring one or more components of the mobility network to maintain a predetermined QoS for the plurality of interactive applications during the journey.

10. The device of claim 9, wherein the operations further comprise:

designating first network components to provide the plurality of interactive applications to the user device over the mobility network;

identifying a reduction in QoS available for the plurality of interactive applications; and designating second network components to provide the plurality of interactive applications to the user device over the mobility network, the second network components selected to maintain the predetermined QoS for the plurality of interactive applications.

11. A non-transitory machine-readable medium, comprising executable instructions that, when executed by a processing system including a processor, facilitate performance of operations, the operations comprising:

receiving, at a mobility network, a request for navigation information from a user device, the user device attached to the mobility network for communication services, the navigation information for a journey of the user device from a source to a destination;

receiving application identification information for a plurality of interactive applications to be used with the user device on the journey of the user device, wherein the plurality of interactive applications includes a video conferencing application and a gaming application;

retrieving subscription information for a user associated with the user device;

determining quality of service (QoS) requirements for the plurality of interactive applications;

determining a navigation path for the journey satisfying the request for navigation information, wherein the determining the navigation path is based on the QoS requirements for the plurality of interactive applications, the subscription information indicating a level of service exceeding a threshold, user preferences of the user, and network information, wherein the network information includes distance information corresponding to a respective distance between the user device and each of a plurality of base stations from the source to the destination, wherein the user preferences are obtained via a mapping application on the user device and based on monitoring a behavior of the user, wherein the user preferences include a preference for an ecologically friendly route, wherein the user preferences indicate that the user prefers to leave a freeway one exit before a closest exit to the destination and take surface streets for a remainder of the journey, and wherein the determining of the navigation path comprises identifying, based on the distance information, a frequency band that will be used by the user device to connect to at least one of the plurality of base stations during the journey; and communicating, based on the determining of the navigation path, navigation path information to the user device.

12. The non-transitory machine-readable medium of claim 11, wherein the operations further comprise:

designating a bearer of the mobility network to support the plurality interactive applications during the journey;

based on the QoS requirements, determining a quality of service class identifier (QCI) for the bearer; and communicating the QCI for the bearer to radio access network devices of the mobility network for communication of information of the plurality of interactive applications between the user device and the radio access network devices of the mobility network.

13. The non-transitory machine-readable medium of claim 11, wherein the operations further comprise:

receiving updated information about QoS metrics in the mobility network during the journey;

modifying the navigation path based on the updated information about QoS metrics in the mobility network, to determine an updated navigation path; and communicating updated navigation path information about the updated navigation path to the user device.

14. The non-transitory machine-readable medium of claim 13, wherein the receiving updated information about QoS metrics comprises:

receiving current key performance indicator (KPI) information for components of the mobility network on the navigation path for the journey.

15. The non-transitory machine-readable medium of claim 14, wherein the receiving current KPI information comprises:

receiving information about dropped calls, number of failed calls and number of connected users during a designated time period.

16. A method, comprising:

receiving, by a processing system including a processor, a request to use a plurality of interactive applications on a user device attached to a mobile network, the plurality of interactive applications requiring a high quality of service on a persistent connection with the mobility network, wherein the plurality of interactive applications includes a video conferencing application and a gaming application;

determining, by the processing system, quality of service (QoS) requirements for the plurality of interactive applications;

retrieving, by the processing system, subscription information for a user associated with the user device;

determining, by the processing system, a navigation path from a source location to a destination location, wherein the determining the navigation path is based on the QoS requirements for the plurality of interactive applications, the subscription information indicating a level of service exceeding a threshold, user preferences of the user, and network information, wherein the network information includes distance information corresponding to a respective distance between the user device and each of a plurality of base stations from the source location to the destination location along each of a plurality of navigation paths, wherein the user preferences are obtained via a mapping application on the user device and based on monitoring a behavior of the user, wherein the user preferences include a preference for avoiding tolls roads, wherein the user preferences indicate that the user prefers to leave a freeway one exit before a closest exit to the destination location and take surface streets for a remainder of a journey from the source location to the destination location, wherein the determining of the navigation path comprises identifying, based on the distance information, a frequency band that will be used by the user device to connect to at least one of the plurality of base stations during the journey from the source location to the destination location, and wherein the navigation path is included in the plurality of navigation paths; and communicating, by the processing system, navigation path information to the user device, the navigation path information cooperating with the mapping application of the user device to provide graphical travel directions to the user device to travel on the navigation path, the navigation path selected to enable continuous use of the plurality of interactive applications by the user of the user device.

17. The method of claim 16, comprising:

creating, by the processing system, a dedicated bearer to carry data traffic of the plurality of interactive applications in the mobility network.

18. The method of claim 16, comprising:

monitoring, by the processing system, QoS for the plurality of interactive applications; and reconfiguring, by the processing system, one or more components of the mobility network to maintain a predetermined QoS for the plurality of interactive applications during the continuous use of the plurality of interactive applications by the user of the user device.

19. The method of claim 16, wherein the gaming application includes a virtual reality (VR) game, and wherein the plurality of interactive applications includes an audio streaming application.

20. The method of claim 16, further comprising:

determining, by the processing system, that a handover involving the user device from a first base station of the plurality of base stations to a second base station of the plurality of base stations is desirable for load balancing as between the first base station and the second base station;

determining, by the processing system and based on the navigation path, that the user device is connected to the first base station for less than a threshold amount of time; and suppressing, by the processing system and based on the determining that the user device is connected to the first base station for less than the threshold amount of time, the handover to reduce a risk of a dropped connection involving the user device and an interruption to an interactive application of the plurality of interactive applications.

* * * * *